United States Patent
Lee et al.

(10) Patent No.: US 10,504,503 B2
(45) Date of Patent: Dec. 10, 2019

(54) METHOD AND APPARATUS FOR RECOGNIZING SPEECH

(71) Applicant: Samsung Electronics Co., Ltd., Suwon-si (KR)

(72) Inventors: Hodong Lee, Yongin-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/585,334

(22) Filed: May 3, 2017

(65) Prior Publication Data

US 2018/0166075 A1 Jun. 14, 2018

(30) Foreign Application Priority Data

Dec. 14, 2016 (KR) ......................... 10-2016-0170183

(51) Int. Cl.
*G10L 15/20* (2006.01)
*G10L 15/02* (2006.01)

(52) U.S. Cl.
CPC .............. *G10L 15/02* (2013.01); *G10L 15/20* (2013.01)

(58) Field of Classification Search
USPC ................................................ 704/224, 234
See application file for complete search history.

(56) References Cited

U.S. PATENT DOCUMENTS

| 8,442,833 | B2 * | 5/2013 | Chen ...................... G10L 25/78 |
| | | | 704/251 |
| 9,830,924 | B1 * | 11/2017 | Degges, Jr. ............. G10L 21/00 |
| 2007/0027685 | A1 | 2/2007 | Arakawa et al. |
| 2007/0088552 | A1 | 4/2007 | Olsen |
| 2007/0239448 | A1 * | 10/2007 | Zlokarnik ............. G10L 15/065 |
| | | | 704/238 |
| 2008/0071540 | A1 * | 3/2008 | Nakano ................... G10L 15/20 |
| | | | 704/251 |
| 2011/0004472 | A1 | 1/2011 | Zlokarnik |
| 2012/0259632 | A1 * | 10/2012 | Willett ..................... G10L 15/02 |
| | | | 704/234 |
| 2013/0332156 | A1 * | 12/2013 | Tackin ................ H04M 1/6041 |
| | | | 704/226 |
| 2016/0042734 | A1 | 2/2016 | Cetinturk |

FOREIGN PATENT DOCUMENTS

KR 10-2014-0076145 A 6/2014

OTHER PUBLICATIONS

Wang et al.; Analysis of effect of compensation parameter estimation for CMN on speech/speaker recognition; 2007 9th International Symposium on Signal Processing and Its Applications; Year: 2007; pp. 1-4.*

(Continued)

*Primary Examiner* — Abul K Azad
(74) *Attorney, Agent, or Firm* — NSIP Law

(57) ABSTRACT

A method performed by a speech recognizing apparatus to recognize speech includes: obtaining a distance from the speech recognizing apparatus to a user generating a speech signal; determining a normalization value for the speech signal based on the distance; normalizing a feature vector extracted from the speech signal based on the normalization value; and performing speech recognition based on the normalized feature vector.

21 Claims, 6 Drawing Sheets

(56) References Cited

OTHER PUBLICATIONS

Georganti et al.; Speaker Distance Detection Using a single Microphone; IEEE Transactions on Audio, Speech, and Language Processing, vol. 19, No. 7, Sep. 2011, pp. 1949-1961 (Year: 2011).*
Sook-Nam Choi, et al., "Cepstral Normalization Combined with CSFN for Noisy Speech Recognition," *Journal of Korea Multimedia Society*, vol. 14, No. 10, Oct. 2011, pp. 1221-1228.

* cited by examiner

200

| Reference distance (m) | Reference average | Reference variance |
|---|---|---|
| 0 | $m_0$ | $v_0$ |
| 1 | $m_1$ | $v_1$ |
| 2 | $m_2$ | $v_2$ |
| 3 | $m_3$ | $v_3$ |
| 4 | $m_4$ | $v_4$ |

| Distance (m) | Global CMVN | Distance CMVN |
|---|---|---|
| 0 | 16.88 | 17.12 |
| 1 | 19.34 | 20.11 |
| 2 | 23.97 | 22.45 |
| 3 | 27.67 | 26.44 |
| 4 | 33.35 | 29.43 |

METHOD AND APPARATUS FOR RECOGNIZING SPEECH

CROSS-REFERENCE TO RELATED APPLICATIONS

This application claims the benefit under 35 USC § 119(a) of Korean Patent Application No. 10-2016-0170183 filed on Dec. 14, 2016, in the Korean Intellectual Property Office, the entire disclosure of which is incorporated herein by reference for all purposes.

BACKGROUND

1. Field

The following description relates to a method of recognizing a speech and a speech recognition apparatus.

2. Description of Related Art

A speech interface is a more natural and intuitive interface than a touch interface. Thus, the speech interface is gaining attention as a next-generation interface that may compensate for flaws found in the touch interface. A core attribute of the speech interface is accuracy in a speech recognition technology. Accordingly, various methods of enhancing the accuracy of speech recognition technology are proposed and speech recognition technology has been gradually developed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method performed by a speech recognizing apparatus to recognize speech includes: obtaining a distance from the speech recognizing apparatus to a user generating a speech signal; determining a normalization value for the speech signal based on the distance; normalizing a feature vector extracted from the speech signal based on the normalization value; and performing speech recognition based on the normalized feature vector.

The determining of the normalization value may include determining, as the normalization value, a reference normalization value corresponding to a reference distance that is closest to the obtained distance among reference normalization values stored in advance corresponding to reference distances.

The determining of the normalization value may include estimating a normalization value corresponding to the obtained distance based on reference normalization values stored in advance corresponding to reference distances.

The determining of the normalization value may include interpolating the normalization value corresponding to the obtained distance based on a result of approximating the reference normalization values.

The normalization value may include an average value and a variance value for converting an average of n-th components included in feature vectors of the speech signal into 0 and converting a variance of the n-th components into a unit variance value.

The normalizing of the feature vector may include normalizing the feature vector based on a cepstral mean variance normalization (CMVN) scheme based on the normalization value.

The determining of the normalization value may include determining, as the normalization value, a reference normalization value corresponding to the obtained distance and a position of the speech recognizing apparatus, among reference normalization values stored in advance corresponding to reference distances and a reference positions.

The method of claim 1 may further include: updating reference normalization values stored in advance corresponding to a reference distance based on the normalized feature vector.

The obtaining of the distance may include obtaining the distance based on an output value of an image sensor configured to photograph the user or an output value of an infrared sensor configured to detect a time of flight of an infrared ray projected towards the user and reflected by the user.

The obtaining of the distance may include estimating the distance based on the speech signal.

A non-transitory computer-readable storage medium may store instructions that, when executed by a processor, cause the processor to perform the method.

In another general aspect, a speech recognizing apparatus includes: a processor; and a memory including at least one instruction executable by the processor, wherein the processor is configured to, in response to the at least one instruction being executed by the processor, obtain a distance from the speech recognizing apparatus to a user generating a speech signal, determine a normalization value for the speech signal based on the distance, normalize a feature vector extracted from the speech signal based on the normalization value, and perform speech recognition based on the normalized feature vector.

The processor may be further configured to determine, as the normalization value, a reference normalization value corresponding to a reference distance that is closest to the obtained distance among reference normalization values stored in advance corresponding to reference distances.

The processor may be further configured to estimate a normalization value corresponding to the obtained distance based on reference normalization values stored in advance.

The processor may be further configured to interpolate the normalization value corresponding to the obtained distance based on a result of approximating the reference normalization values.

The normalization value may include an average value and a variance value for converting an average of n-th components included in feature vectors of the speech signal into 0 and converting a variance of the n-th components into a unit variance value.

The processor may be further configured to normalize the feature vector based on a cepstral mean variance normalization (CMVN) scheme based on the normalization value.

The processor may be further configured to obtain the distance based on an output value of an image sensor configured to photograph the user or an output value of an infrared sensor configured to detect a time of flight of an infrared ray projected towards the user and reflected by the user.

The processor may be further configured to estimate the distance based on the speech signal.

In another general aspect, a speech recognizing apparatus includes: a processor configured to obtain a distance from the speech recognizing apparatus to a user generating a speech signal, normalize a feature vector extracted from the speech signal based on the obtained distance, and perform speech recognition based on the normalized feature vector.

The speech recognizing apparatus may further include: a memory storing reference normalization values corresponding to reference distances, wherein the processor is configured to normalize the feature vector by applying a reference normalization value, among the stored reference normalization values, corresponding to a reference distance, among the reference distances, that corresponds to the obtained distance.

The processor may be further configured to update the stored reference normalization values based on the normalized feature vector.

The processor may be configured to normalize the feature vector based on a cepstral mean variance normalization scheme.

Other features and aspects will be apparent from the following detailed description, the drawings, and the claims.

BRIEF DESCRIPTION OF THE DRAWINGS

FIG. 5 illustrates an example of a word error rate (WER) of a global cepstral mean variance normalization (CMVN) and a distance CMVN.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figures 1, 2:
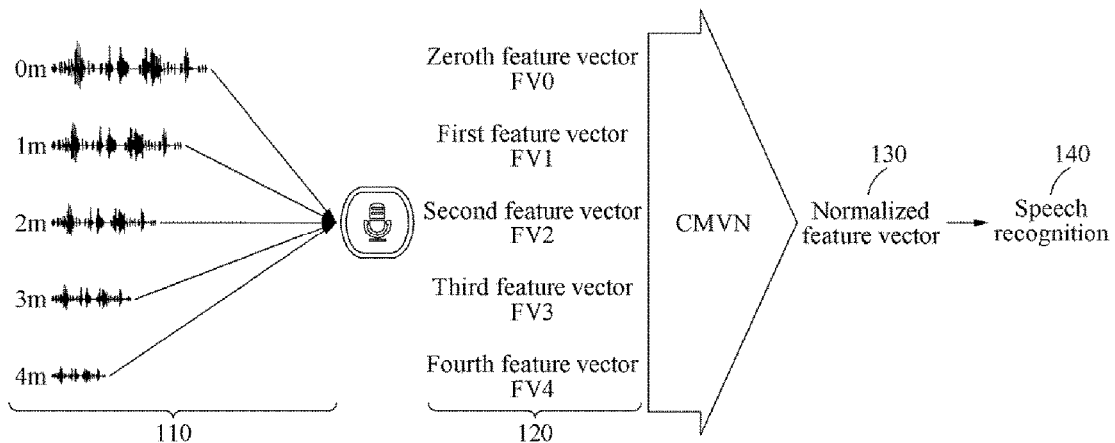
FIG. 1 illustrates an example of a process of recognizing a speech signal through normalization based on a distance.
FIG. 2 illustrates an example of reference normalization values stored in advance corresponding to a reference distance.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions merely describe examples, and the scope of the examples is not limited to the descriptions provided herein. Various changes and modifications can be made to the disclosed examples by those of ordinary skill in the art.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples described below may be used to recognize a speech. The examples may be implemented as various types of products, for example, personal computers, laptop computers, tablet computers, smartphones, smart televisions, smart refrigerators, smart home appliances, intelligent vehicles, kiosks, and wearable devices. For example, the examples are applicable to recognize a speech received by a smartphone, a mobile device, and a wearable device. Hereinafter, reference will now be made in detail to the examples with reference to the accompanying drawings, wherein like reference numerals refer to like elements throughout.

FIG. 1 illustrates an example of a process of recognizing a speech signal through normalization based on a distance.

A speech recognizing apparatus converts a speech signal obtained from a user into a text. For example, the speech recognizing apparatus generates a text corresponding to a speech signal by performing speech recognition based on a feature vector extracted from the speech signal.

The speech signal obtained by the speech recognizing apparatus includes a surrounding noise as well as a speech of the user. In addition, the speech signal may have a distortion in response to the speech signal being transferred to the speech recognizing apparatus from the user. Thus, it is important to remove a noise from the speech signal and minimize the distortion of the speech signal in order to enhance an accuracy of speech recognition. A method of reducing an influence of the noise and the distortion includes a cepstral mean variance normalization (CMVN) scheme.

The CMVN scheme normalizes the speech signal prior to performing speech recognition. The CMVN scheme enhances the accuracy in speech recognition by performing speech recognition on the normalized speech signal. For example, the CMVN scheme normalizes the speech signal by converting an average value of dimensions included in feature vectors extracted from the speech signal into 0 and converting a variance into a unit variance value. Each dimension indicates a degree of each of the feature vectors extracted from the speech signal and one dimension indicates n-th components included in a feature vector. Thus, the CMVN scheme is a scheme for normalizing a speech signal by converting an average of n-th components included in feature vectors extracted from the speech signal into 0 and converting a variance of the n-th components into a unit variance value.

A normalization value is used to normalize the speech signal. The normalization value includes an average value and a variance value for converting the average of the n-th components included in the feature vectors into 0 and converting the variance of the n-th components into the unit variance value. For example, the unit variance value includes 1.

FIG. 1 illustrates an example of a process in which the speech recognizing apparatus recognizes the speech signal input from a user distanced from the speech recognizing apparatus by a predetermined distance.

The speech recognizing apparatus obtains a speech signal 110 from the user. The user may generate the speech signal 110 to be distanced from the speech recognizing apparatus by various distances. An aspect of the speech signal input to the speech recognizing apparatus may vary depending on a distance between the user and the speech recognizing apparatus.

For example, an intensity of a speech signal input from a user distanced from the speech recognizing apparatus by 4 meters is less than an intensity of a speech signal input from a user distanced from the speech recognizing apparatus by 0 meters. Also, the speech signal input from the user distanced from the speech recognizing apparatus by 4 meters is more influenced by a surrounding noise than the speech signal input from the user distanced from the speech recognizing apparatus by 0 meters. A probability that a distortion occurs in the speech signal increases as the speech signal propagates to a long distance. Because the aspect of the speech signal varies depending on the distance from the speech recognizing apparatus to the user, the speech signal is normalized based on the distance from the speech recognizing apparatus to the user.

The speech recognizing apparatus extracts a feature vector 120 from the speech signal 110. Referring to FIG. 1, a zeroth feature vector FV0 indicates a feature vector of the speech signal input from the user distanced from the speech recognizing apparatus by 0 meters. A first feature vector FV1, a second feature vector FV2, a third feature vector FV3, and a fourth feature vector FV4 indicate a feature vector of a speech signal input from a user distanced from the speech recognizing apparatus by 1 meter, a feature vector of a speech signal input from a user distanced from the speech recognizing apparatus by 2 meters, a feature vector of a speech signal input from a user distanced from the speech recognizing apparatus by 3 meters, and a feature vector of a speech signal input from a user distanced from the speech recognizing apparatus by 4 meters, respectively.

The speech recognizing apparatus normalizes the feature vector 120 based on the normalization value. The normalization value is determined based on the distance from the speech recognizing apparatus to the user. That is, the speech recognizing apparatus obtains the distance from the speech recognizing apparatus to the user and determines the normalization value based on the obtained distance.

The speech recognizing apparatus performs speech recognition 140 based on a normalized feature vector 130. For example, the speech recognizing apparatus performs the speech recognition 140, which is robust against distortion and noise that vary based on the distance between the user and the speech recognizing apparatus, by normalizing the feature vector 120 using the normalization value based on the distance and performing the speech recognition 140 based on the normalized feature vector 130.

FIG. 2 includes a table 200 representing an example of reference normalization values stored in advance corresponding to a reference distance.

A speech recognizing apparatus refers to the reference normalization values stored in advance to determine the normalization value based on a distance from a speech recognizing apparatus to a user generating a speech signal. The reference normalization values are mapped to a reference distance and stored in the table 200 in advance.

For example, a reference average value $m_1$ and a reference variance value $v_1$ mapped to a reference distance, 1 meter, are determined from reference speech signals input by a user distanced from the speech recognizing apparatus by the reference distance, 1 meter. A feature vector is extracted from each of the reference speech signals input from the user distanced from the speech recognizing apparatus by the reference distance, 1 meter. The reference average value $m_1$ for converting an average of n-th components included in feature vectors into 0 may is determined and the reference variance value $v_1$ for converting a variance of the n-th components included in the feature vectors into a unit variance value is determined. The determined reference average value $m_1$ and the reference variance value $v_1$ are mapped to the reference distance, 1 meter, and are stored in the table 200. The reference speech signals may be associated with training data for determining the reference normalization value.

Similarly, reference average values and reference variance values based on remaining reference distances are determined and stored in the mapping table 200.

Although FIG. 2 illustrates that the reference distance is set to be 1 meter and the reference average value and the reference variance value based on the set reference distance are stored in advance for ease of description, this is to be understood as a non-limiting example. The reference distance and the reference normalization value are not limited to the examples described herein.

Figure 3:
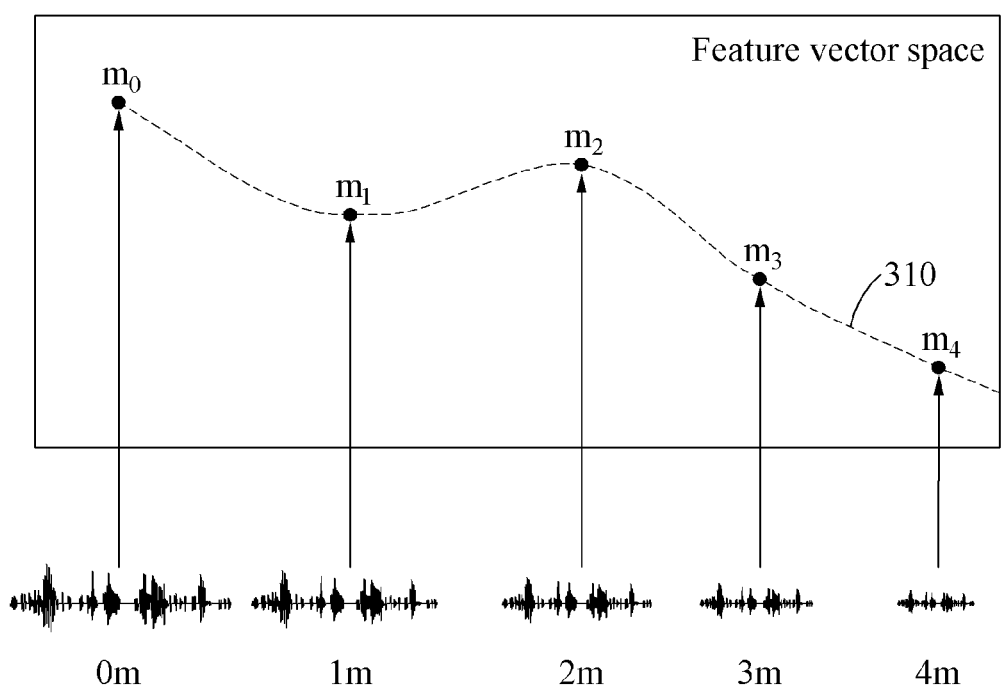
FIG. 3 illustrates an example of a process of determining a normalization value based on a distance.

FIG. 3 illustrates an example of a process implemented by a speech recognizing apparatus to determine a normalization value based on a distance from a speech recognizing apparatus to a user.

The speech recognizing apparatus determines the normalization value using a reference normalization value corresponding to a reference distance that is closest to the distance from the speech recognizing apparatus to the user, among reference normalization values stored in advance. That is, the speech recognizing apparatus determines, as the normalization value, the reference normalization value corresponding to the reference distance that is closest to the distance from the speech recognizing apparatus to the user among the reference normalization values stored in advance.

For example, as illustrated in FIG. 2, in response to the reference normalization values being stored in advance corresponding to a reference distance set to be 1 meter and a speech signal to be a target of speech recognition being input from a user distanced from the speech recognizing apparatus by 2.2 meters, the speech recognizing apparatus identifies a reference distance, 2 meters, that is closest to 2.2 meters, and determines a reference average value $m_2$ and a reference variance value $v_2$ mapped to the reference distance, 2 meters, as normalization values.

In another example, the speech recognizing apparatus estimates a normalization value corresponding to a distance from a speech recognizing apparatus to a user based on reference normalization values stored in advance corresponding to a reference distance. The speech recognizing apparatus interpolates the normalization value corresponding to the distance from the speech recognizing apparatus to the user based on a result of approximating the reference normalization values stored in advance corresponding to the reference distance.

For example, reference average values stored in advance corresponding to the reference distance are indicated by dots in a feature vector space of FIG. 3. The speech recognizing apparatus approximates the reference average values, and the result of approximating the reference average values is represented in a graph 310. A feature vector extracted from a speech signal is abstractly represented in the feature vector space. Although FIG. 3 illustrates the feature vector space in which a horizontal axis indicates a reference distance and a vertical axis indicates a reference average value for ease of description, an actual feature vector space may be a multi-dimensional space and may be different from the feature vector space illustrated in FIG. 3. The speech recognizing apparatus determines a value in the graph 310 corresponding to the distance from the speech recognizing apparatus to the user as an average value of the normalization values.

Although FIG. 3 illustrates a case of approximating the reference average values as an example, the example is also applicable to a case of approximating reference variance values.

Figure 4:
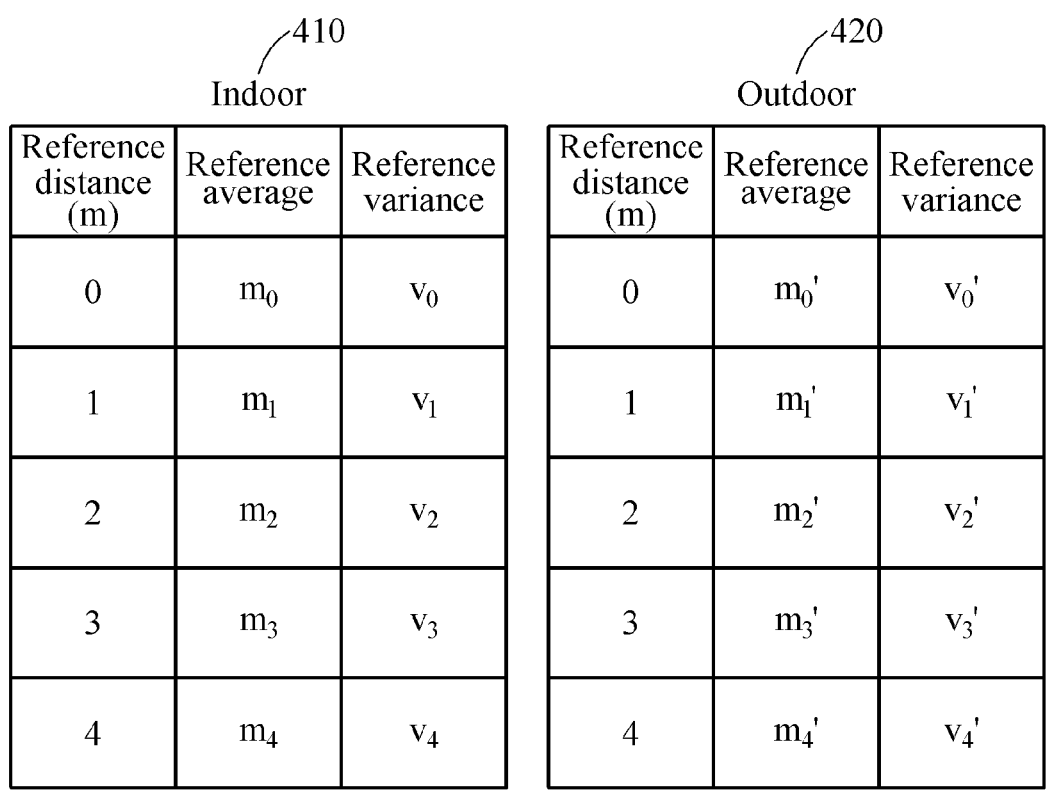
FIG. 4 illustrates an example of reference normalization values stored in advance corresponding to a reference distance and a reference position.

FIG. 4 illustrates an example of reference normalization values stored in advance corresponding to a reference distance and a reference position. That is, FIG. 4 illustrates an example in which a speech recognizing apparatus uses the reference normalization values to determine a normalization value based on a distance and a position.

The speech recognizing apparatus determines the normalization value based on a position of the speech recognizing apparatus. A noise that affects an accuracy in speech recognition may be caused by a surrounding environment of the speech recognizing apparatus to which a speech signal is input. For example, in response to the speech recognizing apparatus being positioned indoors, a noise in a speech signal is caused by a sound of a telephone ring or a sound coming from a television, or a speech of a neighboring person. Alternatively, in response to the speech recognizing apparatus being positioned outdoors, a noise may be caused by a sound of a moving vehicle or a sound of a horn. Thus, the speech recognizing apparatus may effectively reduce an influence of a surrounding noise by determining the normalization value based on the position of the speech recognizing apparatus.

The speech recognizing apparatus may store the reference normalization values based on the reference distance in advance by classifying a case 410 in which the speech recognizing apparatus is positioned indoors and a case 420 in which the speech recognizing apparatus is positioned outdoors. The speech recognizing apparatus obtains the position of the speech recognizing apparatus based on an output value of a position sensor, for example, a global positioning system (GPS) sensor, included in the speech recognizing apparatus. Alternatively, in response to the speech recognizing apparatus being an apparatus, for example, a smart home television or a telephone in a conference room, which is used and disposed at a predetermined position, the speech recognizing apparatus uses a preset position value.

Still referencing FIG. 4, for example, in the case 410, a reference average value $m_1$ and a reference variance value $v_1$ are determined from reference speech signals input from a user distanced from the speech recognizing apparatus by a reference distance, 1 meter, in indoors. A feature vector of each of the speech signals input from the user distanced from the speech recognizing apparatus by the reference distance, 1 meter, is extracted. The reference average value $m_1$ for converting an average of n-th components included in feature vectors into 0 is determined, and a reference variance value $v_1$ for converting a variance of the n-th components included in the feature vectors into a unit variance value is determined.

In the case 420, a reference average value $m_1'$ and a reference variance value $v_1'$ are determined from the reference speech signals input from the user distanced from the speech recognizing apparatus by the reference distance, 1 meter, in outdoors. The feature vector of each of the reference speech signals input from the user distanced from the speech recognizing apparatus by the reference distance, 1 meter, in outdoors is extracted. The reference average value $m_1'$ for converting an average of n-th components included in feature vectors into 0 is determined, and the reference variance value $v_1'$ for converting a variance of the n-th components included in the feature vectors into a unit variance value is determined.

Although FIG. 4 illustrates cases 410 and 420 including normalization values corresponding to a reference distance and a position, cases 410 and 420 are merely examples. The position of the speech recognizing apparatus is not limited to the positions provided in FIG. 4. For example, even in a case in which the speech recognizing apparatus is positioned indoors, the position of the speech recognizing apparatus may be subdivided into a home, an office, and a coffee shop to determine the normalization value.

FIG. 5 includes a table 500 representing an example of a word error rate (WER) of a global cepstral mean variance normalization (CMVN) and a distance CMVN implemented by a speech recognizing apparatus.

Performance in speech recognition estimated through speech signals collected for each distance during 100 hours is represented as the WER in the table 500. The global CMNV is a scheme for normalizing a speech signal based on a normalization value without considering a distance from the speech recognizing apparatus to a user. The distance CMNV is a scheme for normalizing a speech signal based on a normalization value based on a distance.

Referring to the table 500, at a relatively short distance, for example, 0 meters and 1 meter, a difference between a performance of the global CMNV and a performance of the distance CMNV is relatively small. However, at a relatively long distance, for example, 2 meters and 3 meters, the performance of the distance CMNV is better than the performance of the global CMNV.

Figure 6:
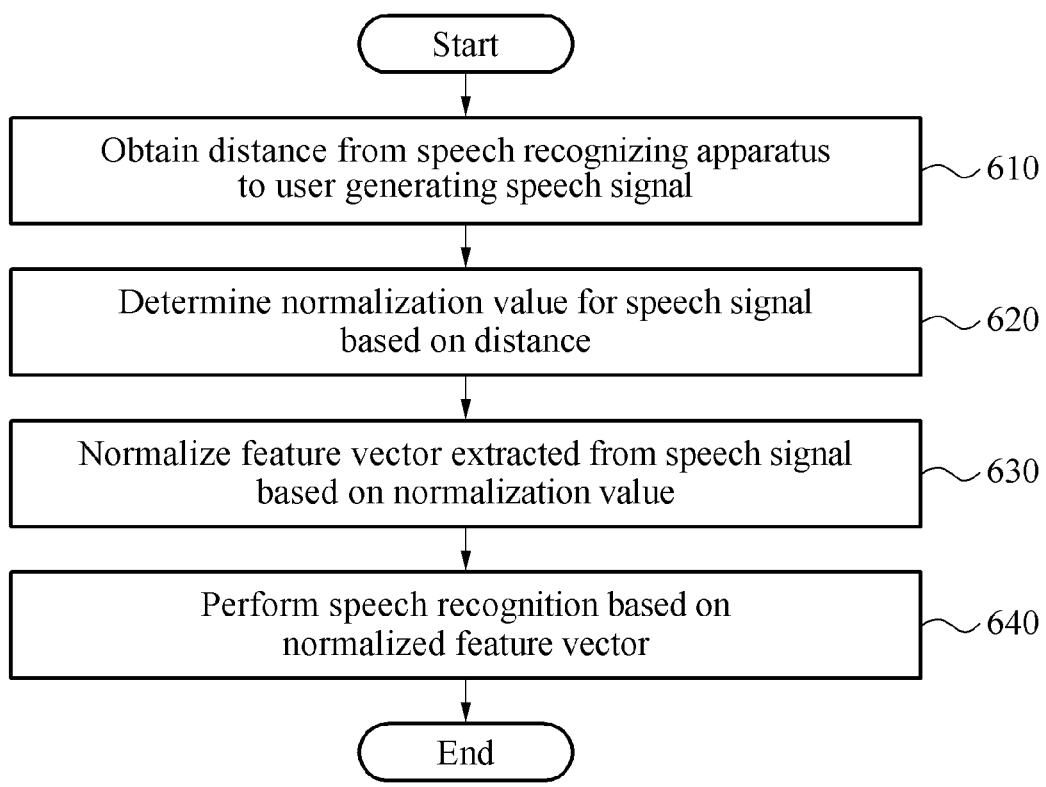
FIG. 6 is a flowchart illustrating an example of a method of recognizing a speech.

FIG. 6 is a flowchart illustrating an example of a method of recognizing a speech performed by a speech recognizing apparatus.

In operation 610, the speech recognizing apparatus obtains a distance from the speech recognizing apparatus to a user generating a speech signal. For example, the speech recognizing apparatus obtains the distance based on an output value of an image sensor configured to photograph the user and an output value of an infrared sensor configured to detect a time of flight of an infrared ray projected towards the user and reflected by the user.

The speech recognizing apparatus may estimate the distance based on the speech signal input from the user. The speech recognizing apparatus may estimate the distance from the speech recognizing apparatus to the user by extracting a beginning portion, for example, 10 frames, of the speech signal during a predetermined period of time and processing the extracted beginning portion of the speech signal using software.

In operation 620, the speech recognizing apparatus determines a normalization value for the speech signal based on the obtained distance. In an example, the speech recognizing apparatus determines, as the normalization value, a reference normalization value corresponding to a reference distance that is closest to the obtained distance among reference normalization values stored in advance.

In another example, the speech recognizing apparatus estimates a normalization value corresponding to the obtained distance based on the reference normalization values stored in advance corresponding to the reference distance. The speech recognizing apparatus may interpolate the normalization value corresponding to the obtained distance based on a result of approximating the reference normalization values stored in advance corresponding to the reference distance.

The normalization value includes an average value and a variance value for converting an average of n-th components included in feature vectors of the speech signal input by the user distanced from the speech recognizing apparatus by the obtained distance into 0 and converting a variance of the n-th components into a unit variance value.

In another example, the speech recognizing apparatus determines the normalization value corresponding to the obtained distance and a position of the speech recognizing apparatus based on the reference normalization values stored in advance corresponding to the reference distance and a reference position.

In operation 630, the speech recognizing apparatus normalizes the feature vector extracted from the speech signal based on the normalization value. For example, the speech recognizing apparatus normalizes the feature vector based on a cepstral mean variance normalization (CMVN) scheme based on the normalization value.

In operation 640, the speech recognizing apparatus performs speech recognition based on the normalized feature vector.

The speech recognizing apparatus may update the reference normalization values stored in advance corresponding to the reference distance based on the normalized feature vector. For example, the feature vector extracted from the speech signal is normalized based on the normalization value estimated from the reference normalization values stored in advance. The speech recognizing apparatus may obtain the normalization value that more precisely corresponds to the obtained distance based on the normalized feature vector. Also, the speech recognizing apparatus may update the reference normalization values by mapping and storing the obtained normalization value to the corresponding distance. As a normalization process is performed on the speech signal, the reference normalization values stored in advance may be updated. An influence of a noise and a distortion to the speech signal are effectively reduced by performing a precise normalization process based on the updated reference normalization values.

Repeated descriptions will be omitted for increased clarity and conciseness because the descriptions provided with reference to FIGS. 1 through 5 are also applicable to FIG. 6.

Figure 7:
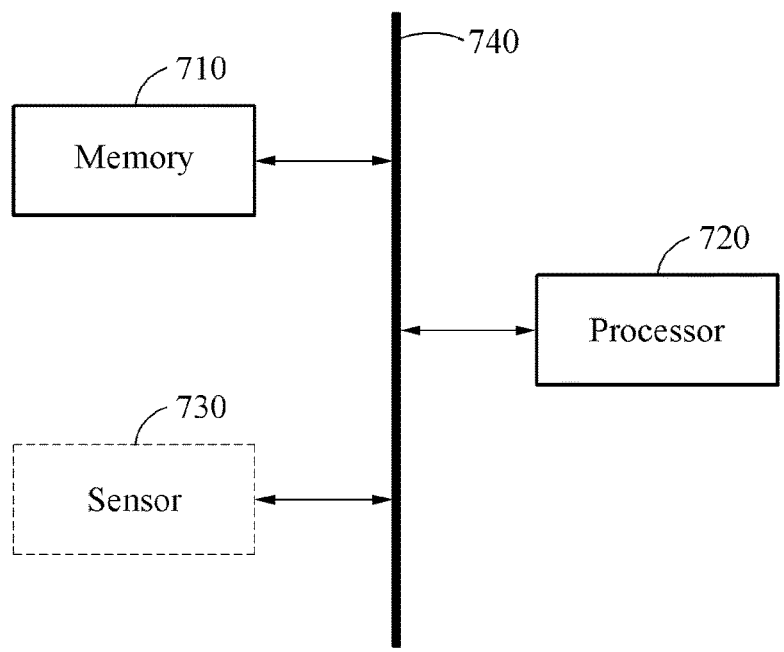
FIG. 7 is a block diagram illustrating an example of a speech recognizing apparatus.

FIG. 7 is a block diagram illustrating an example of a speech recognizing apparatus 700. Referring to FIG. 7, the speech recognizing apparatus 700 includes a memory 710 and a processor 720. The speech recognizing apparatus 700 further includes a sensor 730. The memory 710, the processor 720, and the sensor 730 communicate with each other via a bus 740.

The memory 710 includes a volatile memory or a non-volatile memory and stores information received via the bus 740. The memory 710 includes at least one instruction executable by the processor 720. The memory 710 stores reference normalization values corresponding to a reference distance.

The memory 710 stores a neural network for speech recognition. Each neural network is stored in the memory 710 in a form of an executable file or an object file to be executable. In addition, parameters for each neural network are stored in the memory 710.

The processor 720 executes at least one instruction stored in the memory 710. The processor 720 obtains a distance from the speech recognizing apparatus 700 to the user generating the speech signal. The processor 720 determines the normalization value, for example, an average value and a variance value, for the speech signal based on the obtained distance. The processor 720 normalizes the feature vector extracted from the speech signal based on the normalization value.

The processor 720 performs speech recognition based on the normalized feature vector. The processor 720 implements each neural network for speech recognition by loading each neural network from the memory 710 and applying the corresponding parameters to each neural network.

The sensor 730 is a device for measuring the distance from the speech recognizing apparatus 700 to the user and includes, for example, an image sensor and an infrared sensor. For example, the sensor 730 is an image sensor configured to output an image by photographing the user. In addition, the sensor 730 may be an infrared sensor configured to detect a time of flight of the infrared ray projected towards the user and reflected by the user.

The processor 720 obtains the distance from the speech recognizing apparatus 700 to the user from an output value of the sensor 730. Alternatively, the processor 720 estimates the distance based on the speech signal input from the user through a microphone included in the speech recognizing apparatus 700.

Repeated descriptions will be omitted for increased clarity and conciseness because the descriptions provided with reference to FIGS. 1 through 6 are also applicable to the elements of FIG. 7.

Figure 8:
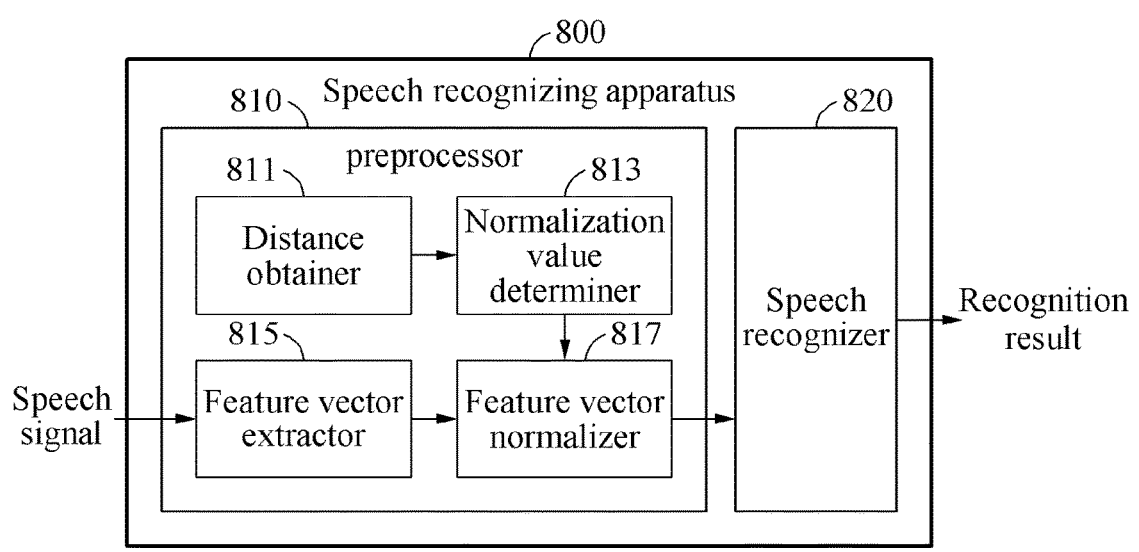
FIG. 8 is a block diagram illustrating another example of a speech recognizing apparatus.

FIG. 8 is a block diagram illustrating another example of a speech recognizing apparatus 800. Referring to FIG. 8, the speech recognizing apparatus 800 includes a preprocessor 810 and a speech recognizer 820.

The preprocessor 810 includes a distance obtainer 811, a normalization value determiner 813, a feature vector extractor 815, and a feature vector normalizer 817.

The distance obtainer 811 obtains a distance from the speech recognizing apparatus 800 to a user. For example, the distance obtainer 811 obtains the distance based on an output value of an image sensor configured to photograph the user or an output value of an infrared sensor configured to detect a time of flight of an infrared ray projected towards the user and reflected by the user. Also, the distance obtainer 811 may estimate the distance based on a speech signal input from the user.

The normalization value determiner 813 determines a normalization value for the speech signal based on the obtained distance. For example, the normalization value determiner 813 determines, as the normalization value, the reference normalization value corresponding to a reference distance that is closest to the obtained distance among reference normalization values stored in advance. Also, the normalization value determiner 813 may estimate the normalization value corresponding to the obtained distance based on the reference normalization values stored in advance corresponding to the reference distance.

The feature vector extractor 815 extracts a feature vector from the speech signal. For example, the feature vector extractor 815 extracts the feature vector from the speech signal through a mel-frequency cepstral coefficient (MFCC) and a filter bank.

The feature vector normalizer 817 normalizes the feature vector based on the normalization value. For example, the feature vector normalizer 817 normalizes the feature vector based on a cepstral mean variance normalization (CMVN) scheme based on the normalization value.

The speech recognizer 820 performs speech recognition based on the normalized feature vector. For example, the speech recognizer 820 outputs a result of the speech recognition from the normalized feature vector using a neural network.

Repeated descriptions will be omitted for increased clarity and conciseness because the descriptions provided with reference to FIGS. 1 through 7 are also applicable to the elements of FIG. 8.

According to examples provided herein, it is possible to perform speech recognition with a relatively high accuracy, not only at a short distance, but also at a long distance by normalizing a speech signal based on a normalization value determined based on a distance from a speech recognizing apparatus to a user that generates the speech signal.

Also, according to the examples, it is possible to enhance an accuracy of speech recognition by using a normalization value estimated based on a reference normalization value corresponding to a reference distance that is closest to a distance from a speech recognizing apparatus to a user, or normalization values stored in advance corresponding to the reference distance.

Furthermore, according to the examples, it is possible to perform speech recognition that is robust against a surrounding noise or a distortion of a speech signal by determining a normalization value based on a distance from a speech recognizing apparatus to a user in addition to a position of the speech recognizing apparatus.

Also, according to the examples, it is possible to precisely normalize a speech signal by updating a reference normalization value stored in advance based on a normalized feature vector.

The memory 710, the processor 720, and the sensor 730 in FIG. 7, and the preprocessor 810, the distance obtainer 811, the normalization value determiner 813, the feature vector extractor 815, the feature vector normalizer 817, and the speech recognizer 820 in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 3 and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method performed by a speech recognizing apparatus to recognize speech, the method comprising:
    obtaining a distance from the speech recognizing apparatus to a user generating a speech signal;
    determining a reference distance being closest to the obtained distance from among a plurality of reference distances;
    determining a normalization value for the speech signal based on one or more reference normalization values obtained from a database using the determined reference distance, the database storing a plurality of reference normalization values specific to each of the plurality of reference distances,
    wherein the determining of the normalization value comprises estimating a normalization value corresponding to the obtained distance based on the one or more reference normalization values of the plurality of reference normalization values, and interpolating the normalization value corresponding to the obtained distance based on a result of approximating the reference normalization values;
    performing a respective extracting of feature vectors from the speech signal;
    performing a normalizing of the extracted feature vectors based on the determined normalization value; and
    performing speech recognition based on the normalized feature vectors.

2. The method of claim 1, wherein the determining of the normalization value comprises determining from the database, as the normalization value, a reference normalization value, from the plurality of reference normalization values, corresponding to the determined reference distance.

3. The method of claim 1, wherein the normalization value comprises an average value and a variance value for converting an average of n-th components included in the feature vectors of the speech signal into 0 and converting a variance of the n-th components into a unit variance value.

4. The method of claim 1, wherein the performing of the normalizing of the feature vectors comprises performing of the normalizing of the feature vectors based on a cepstral mean variance normalization (CMVN) scheme based on the normalization value.

5. The method of claim 1, wherein the determining of the normalization value comprises determining from the database, as the normalization value, a reference normalization value, from the plurality of reference normalization values, corresponding to the obtained distance and a position of the speech recognizing apparatus.

6. The method of claim 1, further comprising:
    updating reference normalization values, of the plurality of reference normalization values, corresponding to the determined reference distance based on the normalized feature vectors.

7. The method of claim 1, wherein the obtaining of the distance comprises obtaining the distance based on an output value of an image sensor configured to photograph the user or an output value of an infrared sensor configured to detect a time of flight of an infrared ray projected towards the user and reflected by the user.

8. The method of claim 1, wherein the obtaining of the distance comprises estimating the distance based on the speech signal.

9. A non-transitory computer-readable storage medium storing instructions that, when executed by a processor, cause the processor to perform the method of claim 1.

10. A speech recognizing apparatus comprising:
a processor configured to:
obtain a distance from the speech recognizing apparatus to a user generating a speech signal;
determine a reference distance being closest to the obtained distance from among a plurality of reference distances;
determine a normalization value for the speech signal based on one or more reference normalization values obtained from a database using the determined reference distance, the database storing a plurality of reference normalization values specific to each of the plurality of reference distances;
perform a respective extracting of feature vectors from the speech signal;
perform a normalizing of the extracted feature vectors based on the determined normalization value; and
perform speech recognition based on the normalized feature vectors,
wherein, for the determining of the normalization value, the processor is further configured to estimate a normalization value corresponding to the obtained distance based on the one or more reference normalization values of the plurality of reference normalization values, and interpolate the normalization value corresponding to the obtained distance based on a result of approximating the reference normalization values.

11. The speech recognizing apparatus of claim 10, wherein the processor is further configured to determine, as the normalization value, a reference normalization value, from the plurality of reference normalization values, corresponding to the determined reference distance.

12. The speech recognizing apparatus of claim 10, wherein the normalization value comprises an average value and a variance value for converting an average of n-th components included in the feature vectors of the speech signal into 0 and converting a variance of the n-th components into a unit variance value.

13. The speech recognizing apparatus of claim 10, wherein the processor is further configured to perform the normalizing of the feature vectors based on a cepstral mean variance normalization (CMVN) scheme based on the normalization value.

14. The speech recognizing apparatus of claim 10, wherein the processor is further configured to obtain the distance based on an output value of an image sensor configured to photograph the user or an output value of an infrared sensor configured to detect a time of flight of an infrared ray projected towards the user and reflected by the user.

15. The speech recognizing apparatus of claim 10, wherein the processor is further configured to estimate the distance based on the speech signal.

16. The speech recognizing apparatus of claim 10, further comprising:
the memory, the memory further comprising at least one instruction executable by the processor, wherein the processor is configured to, in response to the at least one instruction being executed by the processor, perform the obtaining of the distance, the determining of the reference distance, the determining of the normalization value, the performing of the respective extracting, the performing of the normalizing, and the performing of the speech recognition.

17. The speech recognizing apparatus of claim 10, wherein the speech recognizing apparatus is an electronic device comprising an image sensor configured to photograph the user.

18. A speech recognizing apparatus, comprising:
a processor configured to
obtain a distance from the speech recognizing apparatus to a user generating a speech signal;
perform a respective extracting of feature vectors from the speech signal;
determine a reference distance being closest to the obtained distance from among a plurality of reference distances;
perform a normalizing of the extracted feature vectors based on a normalization value based on one or more reference normalization values obtained from a memory using the determined reference distance, the memory storing a plurality of normalization values specific to each of the plurality of reference distances,
wherein, for the performing the normalizing, the processor is further configured to estimate a normalization value corresponding to the obtained distance based on the one or more reference normalization values of the plurality of reference normalization values, and interpolate the normalization value corresponding to the obtained distance based on a result of approximating the reference normalization values; and
perform speech recognition based on the normalized feature vectors.

19. The speech recognizing apparatus of claim 18, further comprising:
the memory,
wherein the processor is configured to perform the normalizing of the feature vectors by applying a reference normalization value, among the plurality of reference normalization values, corresponding to the determined reference distance.

20. The speech recognizing apparatus of claim 19, wherein the processor is further configured to update reference normalization values, of the plurality of reference normalization values, based on the normalized feature vectors.

21. The speech recognizing apparatus of claim 18, wherein the processor is configured to perform the normalizing of the feature vectors based on a cepstral mean variance normalization scheme.

* * * * *